June 26, 1962 — R. B. GRISBROOK — 3,040,725
INTERNAL COMBUSTION ENGINE
Filed Nov. 14, 1961
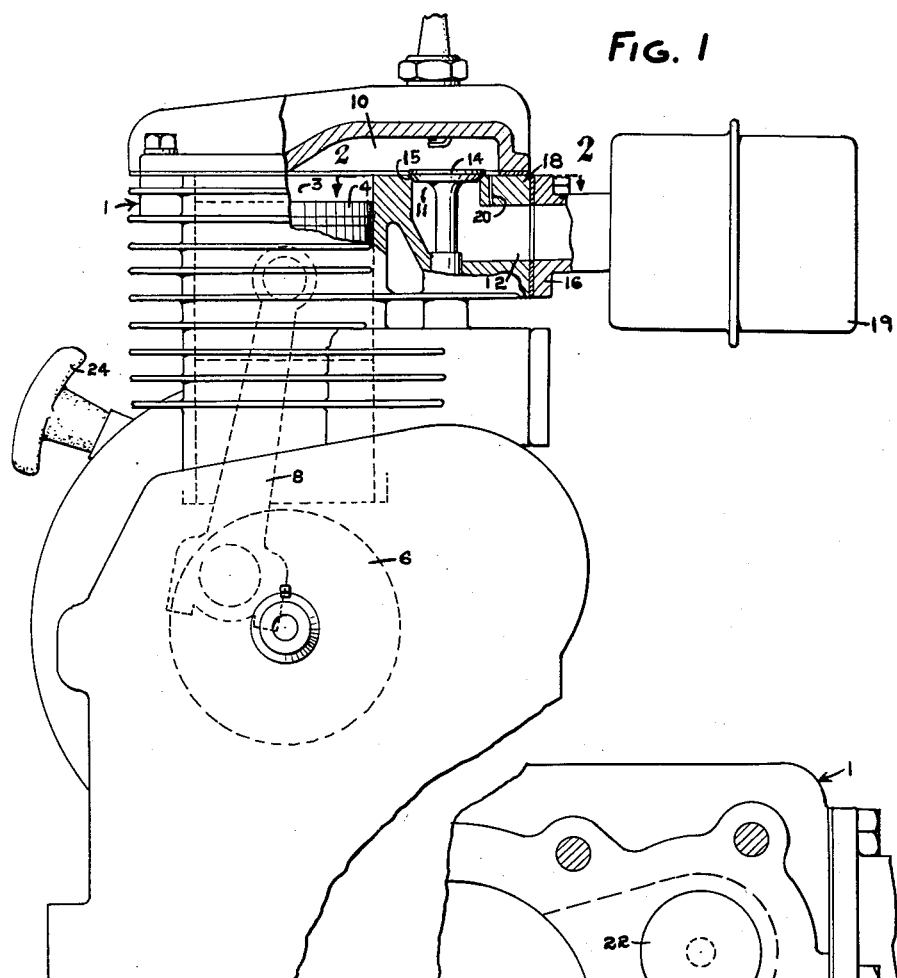
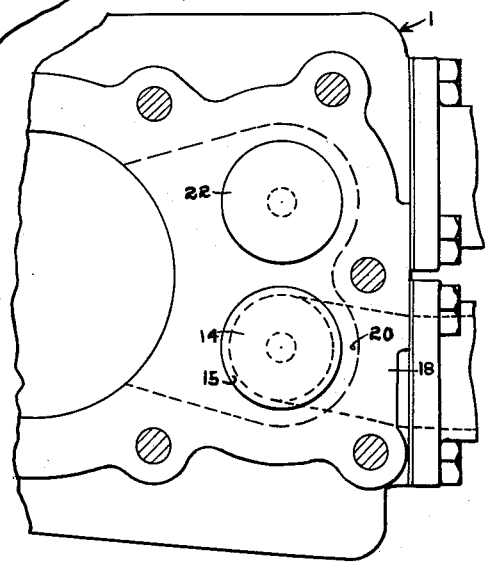
INVENTOR.
Robert B. Grisbrook
BY
Barnes, Kisselle, Raisch & Choate
ATTORNEYS

3,040,725
INTERNAL COMBUSTION ENGINE
Robert B. Grisbrook, St. Louis, Mo., assignor to Tecumseh Products Company, Tecumseh, Mich., a corporation of Michigan
Filed Nov. 14, 1961, Ser. No. 152,277
8 Claims. (Cl. 123—182)

This invention relates to internal combustion engines particularly the lower horsepower varieties commonly used as the prime movers for garden tractors and lawn mowers, and has as its primary purpose to facilitate easy engine starting with only slight exertion of work.

The object of this invention is to facilitate the ease with which such an internal combustion engine may be started by an arrangement which requires a minimum change in production techniques, which is the ultimate in simplicity yet is positive and dependable in its operation, which is not subject to substantial clearance variations normally incident to wear and which materially reduces the work required to start an engine without appreciably affecting horsepower losses during normal running conditions.

The invention is practiced by providing a small diameter hole or passageway which continuously vents the combustion chamber into an environment of lower pressure than the pressure existing in the combustion chamber during the compression stroke. More particularly, the invention contemplates a hole through the engine block to connect the combustion chamber with the exhaust duct at all times during starting and running.

In the accompanying drawing:

FIG. 1 is a plan view having a cutaway portion to expose the exhaust valve and illustrating the position of the venting hole in the preferred embodiment of the invention, and FIG. 2 is a cross section along lines 2—2 of FIG. 1 and also illustrates the placement of the venting hole with respect to the exhaust valve.

FIGS. 1 and 2 illustrate a conventional four-stroke internal combustion engine commonly used on ordinary lawn mowers or the like, including a block 1 having a cylinder 3 and an axially sliding piston 4 operatively connected to crankshaft 6 by piston rod 8. Combustion chamber 10 is associated with cylinder 3 in the usual manner, the exhaust gases being expelled from the combustion chamber through exhaust port 11, exhaust duct 12, manifold 16 and muffler 19 during the exhaust stroke of piston 4. Exhaust port 11 is controlled by an exhaust valve 14 which rests in valve seat 15. The valve 14 is actuated by conventional camming means not shown.

Included adjacent the valve seat 15 of exhaust valve 14 and extending through the portion 18 of the block 1 is a small hole or passageway 20 connecting the combustion chamber 10 with the exhaust port 12 to continuously vent the combustion chamber. It is noted that the venting hole 20 remains unobstructed during all four strokes of piston 4. Under starting conditions when the piston is moving slowly, the hole provides sufficient venting to appreciably reduce the engine's compression, but yet during running conditions when the piston is moving rapidly there is no substantial horsepower loss. Venting is accomplished without any moving parts whose clearances would vary as an incident to wear.

FIG. 2 shows the position of the venting hole 20 with respect to the valve seat 15 of exhaust valve 14.

In the preferred embodiment the invention is applied to a conventional four-stroke gasoline engine by merely drilling a 0.030 inch diameter hole through a portion of the block adjacent the exhaust valve seat. This provides a reasonable compromise between starting and operating compression leakage to attain the objects of this invention. Hole diameter and location may of course be varied so long as compression leakage remains relatively small with respect to the exhaust capacity of the exhaust valve, sufficiently relieving compression to reduce the work required to start the engine without sufficiently affecting compression or impairing horsepower at normal operating speeds to preclude acceptable engine performance. Hole diameter variations within the range of 0.010 to 0.060 inch are permissible, as are variations in the hole's length-to-diameter ratio within the range of five to fifteen. Additionally appreciable decreases in starting or cranking effort may be realized with an accompanying horsepower loss of only two to six percent, about a four percent average, at normal running speeds. Although particularly adapted to four-stroke engines the invention can readily be adapted to a two-stroke engine by properly positioning the venting hole to cooperate with the exhaust duct during a substantial portion of the compression stroke.

Aside from the venting passageway, the engine is conventional and is started in the customary manner by pulling handle 24 which in view of the above disclosure requires less work than with conventional engines and facilitates easy starting.

I claim:

1. In an internal combustion engine of the type having a combustion chamber associated with a cylinder, a piston movable within said cylinder and valve controlled intake and exhaust ports; means for facilitating easy engine starting comprising a vent in said combustion chamber communicating at all times with an environment of substantially lesser pressure than said engine's compression pressure, said vent having a relatively small cross section whereby said compression pressure in said combustion chamber is materially reduced under starting conditions when said piston is moving slowly to facilitate easy starting but is not sufficiently affected when said piston is moving rapidly under normal running conditions to cause substantial horsepower loss.

2. A device as defined in claim 1 wherein said vent comprises an unobstructed hole connecting said combustion chamber to said environment of substantially lesser pressure.

3. A device as defined in claim 2 wherein said hole has a diameter in the order of 0.030 inch.

4. A device as defined in claim 2 wherein said hole has a diameter within the range of from 0.01 to 0.060 inch.

5. A device as recited in claim 1 wherein said engine further comprises an exhaust duct, said exhaust duct being said environment of lesser pressure.

6. A device as recited in claim 5 wherein said venting means comprises a passageway directly connecting said combustion chamber to said exhaust duct during said compression and expansion strokes.

7. In an internal combustion engine having an engine block, a cylinder within said block, said cylinder being associated with a combustion chamber to accommodate a combustible charge which undergoes sequential compression, ignition and expansion, a piston movable within said cylinder and having a compression and expansion stroke, a combustion chamber intake means for charging said combustion chamber with said combustible mixture and a combustion chamber exhaust means for eliminating combustion products from said combustion chamber, that improvement which comprises a venting means operable during a substantial portion of every compression and expansion stroke to establish limited communication between said combustion chamber and an environment of substantially lesser pressure than the pressure existing in said combustion chamber during said compression stroke whereby the pressure in said combustion chamber is materially reduced under starting conditions when the piston is moving slowly to facilitate easy engine starting but is not sufficiently affected when the piston is running rapidly under normal operating conditions to cause substantial horsepower loss.

8. A four-stroke internal combustion engine having an intake stroke, a compression stroke, an expansion stroke and an exhaust stroke which comprises an engine block, a cylinder within said block, a piston movable within said cylinder, a combustion chamber associated with said cylinder and said block to accommodate a combustible charge, a valve controlled intake port for admitting said combustible charge into said combustion chamber during said intake stroke, an exhaust duct located within said block and having a first and second passageway into said combustion chamber for connecting said combustion chamber with an environment of substantially atmospheric pressure, said second passageway being relatively small with respect to said first passageway, valve means for closing said first passageway during said intake, compression and expansion strokes, and said second passageway being unobstructed during the entire sequence of intake, compression, expansion and exhaust strokes whereby pressure within said combustion chamber during said compression stroke is substantially reduced under starting conditions when said piston is moving slowly but said pressure is not significantly reduced when said piston is moving rapidly under normal running conditions.

References Cited in the file of this patent
UNITED STATES PATENTS

| | | |
|---|---|---|
| 1,156,123 | Wygodsky | Oct. 12, 1915 |
| 1,238,221 | Tibbetts | Aug. 28, 1917 |
| 2,042,967 | Russell | June 2, 1936 |
| 2,999,491 | Harkness | Sept. 12, 1961 |